United States Patent [19]

Bogdanski et al.

[11] 4,155,440

[45] May 22, 1979

[54] DOCUMENT TURNING STATION

[75] Inventors: John J. Bogdanski, Stamford; Gerald C. Freeman, Darien, both of Conn.

[73] Assignee: Pitney-Bowes, Inc., Stamford, Conn.

[21] Appl. No.: 812,516

[22] Filed: Jul. 5, 1977

[51] Int. Cl.[2] .............................................. B65G 47/24

[52] U.S. Cl. .................................... 198/399; 198/415; 271/185; 271/274

[58] Field of Search ............... 271/185, 184, 251, 225, 271/250, 274, 273, 272; 198/415, 401, 411, 416, 399, 395

[56] References Cited

U.S. PATENT DOCUMENTS

| | | | |
|---|---|---|---|
| 2,407,174 | 9/1946 | Oberender | 198/415 X |
| 3,321,062 | 5/1967 | Brockmüller et al. | 198/415 |
| 3,603,446 | 9/1971 | Maxey et al. | 198/401 |
| 3,758,104 | 9/1973 | Daily | 271/185 |

FOREIGN PATENT DOCUMENTS

| | | | |
|---|---|---|---|
| 976333 | 11/1964 | United Kingdom | 271/274 |

*Primary Examiner*—Bruce H. Stoner, Jr.
*Attorney, Agent, or Firm*—Donald P. Walker; William D. Soltow, Jr.; Albert W. Scribner

[57] ABSTRACT

A document handling device that is adapted to turn a document such as a letter or other flat mail piece through an angle of substantially 90 degrees in its own plane by means of a plurality of pairs of feed rollers, the latter being respectively driven at different effective speeds which are proportional to the respective distances of said feed roller pairs from a predetermined axis located adjacent the lower leading corner of said document. The geometry of the system is such that the lower edge of the document before and after being turned is adapted to move along one substantially horizontal planar surface. Provision is made for enabling at least some of said feed roller pairs to feed a document without turning the latter through said 90 degree angle.

6 Claims, 4 Drawing Figures

DOCUMENT TURNING STATION

BACKGROUND OF THE INVENTION

In certain types of document handling operations it is desirable to be able to re-orient a document during its transit along a predetermined feed path. For example in certain types of mail handling equipment wherein vertically disposed mixed size mail pieces are stream fed in a horizontal direction along their lower edges it is occasionally necessary to re-orient a flat mail piece that happens to have its long dimension extending vertically rather than horizontally. In such a situation the document or mail piece must be rotated or turned in its own plane through approximately 90 degrees so that the said long axis of the horizontally moving document is now horizontal. In other types of mail handling operations, such as stamp cancelling, it is desirable to be able to change the position of a mail piece being transported from a postage stamp "leading" to a stamp "trailing" condition. In this situation the letter or other flat mail piece must be turned through 180 degrees or end for end during the course of its feed movement to the stamp cancelling station.

Prior art document handling devices that are capable of producing such 90 and/or 180 degree position shifting operations have not only been somewhat complex and expensive but have also had a tendency to impose rough physical treatment on the mail piece as the latter accommodates the various rubbing and/or flexure forces required for such positional shifting. Also the prior art devices in most cases require the document to be re-aligned with respect to the feed deck or initial feed path after being rotated through such 90 or 180 degree turns.

SUMMARY OF THE INVENTION

The present invention contemplates the provision of a document turning station along a document feed path, which station affords a more efficient means for turning or shifting the position of a document that is to be fed along said feed path. This turning action may take place either through one 90 degree shift movement when it is desired to simply locate the then vertical axis of the document generally parallel to the horizontal direction of document feed motion, or through two successive such 90 degree turns when it is desired to turn the document or letter end for end as the latter moves along said feed path. To produce each such 90 degree shift in the orientation of the document several aligned pairs of feed rollers are provided for simultaneously frictionally engaging the document; the various roller pairs being driven at different effective peripheral speeds that are proportional to the respective distances between said feed roller pairs and the lower edge of a document moving along a predetermined feed surface. Here when the documents to be handled are vertically oriented and serially fed horizontally on their lower edges into the turning station and when said pairs of feed rollers are driven at said different effective peripheral speeds, each successive document will be turned through 90 degrees in its own plane and about its lower leading corner while being moved through said turning station.

The geometry of the present system is arranged so that the lower edge of each document, as it is constituted both before and after the turning operation, is disposed in the same plane, i.e., along the substantially horizontal planar upper surface of the feed deck of the present apparatus, and thus no re-alignment of the document with respect to a straight feed path is required after a 90 or 180 degree turning operation. The present apparatus is further provided with an alternate drive means which may be enabled so as to cause the feed rollers at said station to move a document straight through the station without being turned.

The primary object of the invention is to provide a novel apparatus for turning a document in its own plane through a substantially 90 degree turn about a transverse axis located adjacent one of the document corners.

Another object of the invention is to provide an improved document turning device having a plurality of aligned pairs of feed rollers that are respectively driven at different effective speeds that are proportional to the respective distances of said pairs of feed rollers from a predetermined axis.

A further object of the invention is to provide a novel document handling means that is selectively conditionable so as to either turn or not turn a document as the latter moves past said handling means.

Other objects of the invention will become apparent as the disclosure progresses.

DETAILED DESCRIPTION OF THE INVENTION

Figure 1:
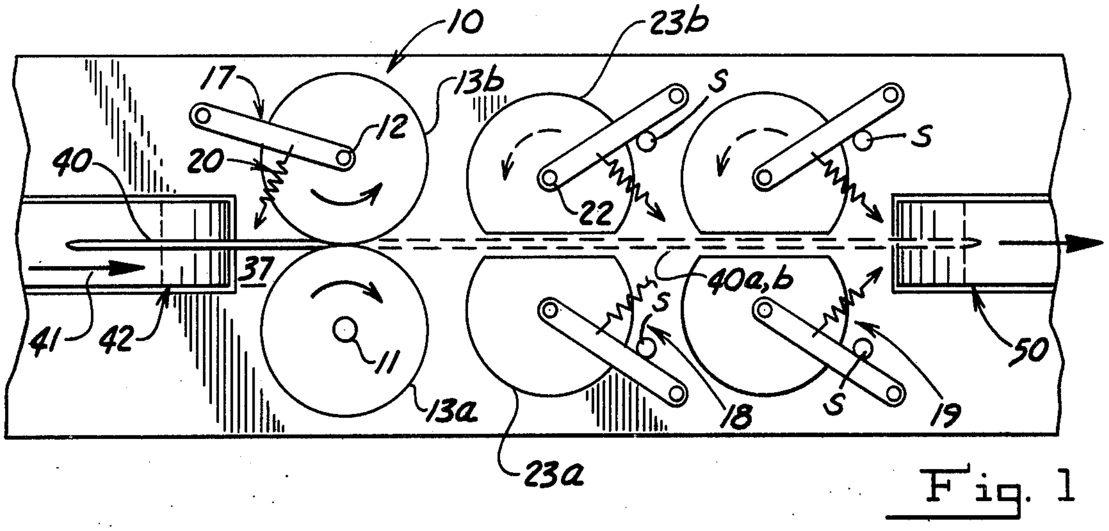
FIG. 1 is a diagrammatic type plan view illustrating the functional nature of the present invention.
Figure 2:
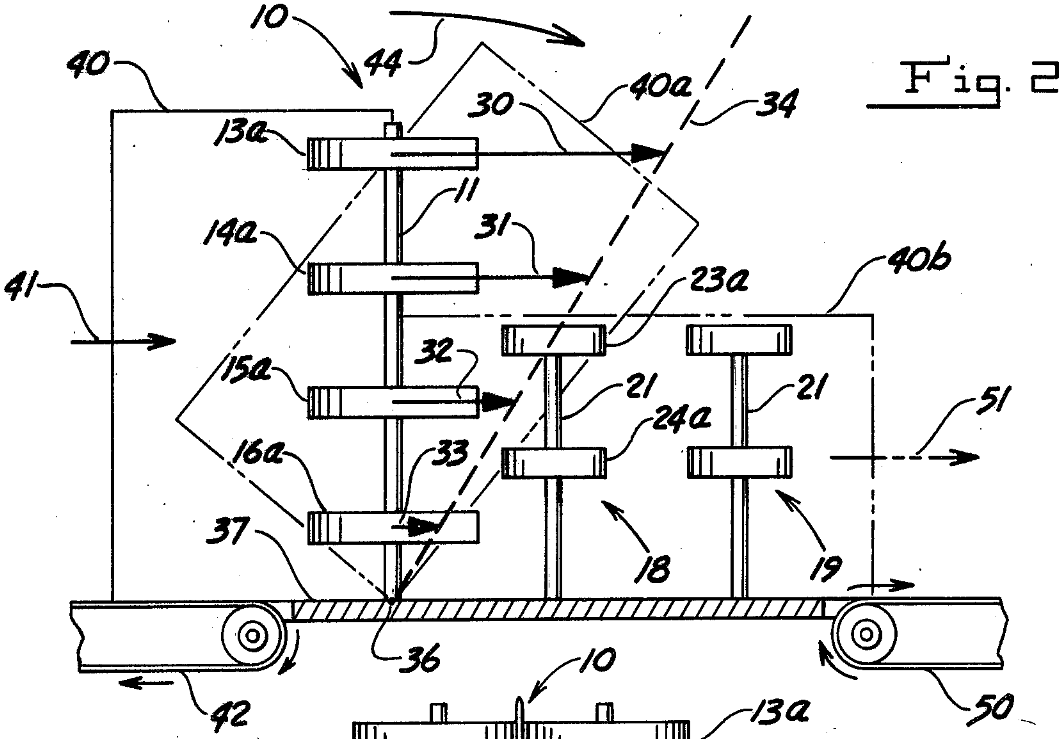
FIG. 2 is a diagrammatic type front elevational view of the arrangement illustrated in FIG. 1.
Figure 3:
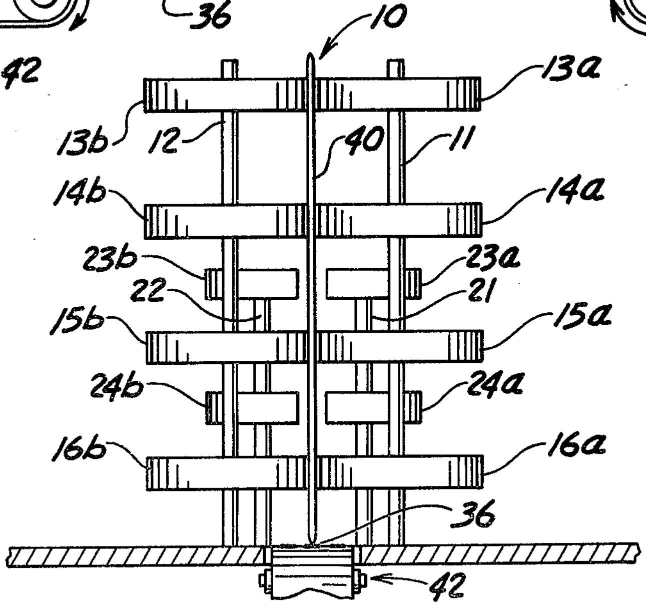
FIG. 3 is a diagrammatic type end view taken from the left side of FIG. 2.

A functional description of the invention will be presented first with reference to FIGS. 1-3 which illustrate the concept of operation of the instant apparatus. Here a document turning station 10 is provided which includes two vertically disposed shafts 11 and 12 which carry a vertical array of four cooperating pairs of feed rollers 13*a* and 13*b*, 14*a* and 14*b*, 15*a* and 15*b*, and 16*a* and 16*b* respectively. The shaft 12 is swingably supported by suitable pivot arm means 17, FIG. 1, that is yieldably biased by a suitable spring means 20 so that the periphery of the feed rollers 13*b*, 14*b*, 15*b* and 16*b* carried by the vertical shaft 12 are respectively yieldably urged into cooperating engagement with the feed rollers 13*a*, 14*a*, 15*a* and 16*a* carried by the vertical shaft 11. The feed rollers 13*a*, 14*a*, 15*a* and 16*a* are adapted to be individually rotatably driven at different effective peripheral speeds as is indicated by arrows 30, 31, 32, and 33 respectively, FIG. 2, these peripheral speeds being proportional, as indicated by dotted line 34 of FIG. 2, to the vertical distance of each of the cooperating feed roller pairs (16*a*–16*b*, 15*a*–15*b*, 14*a*–14*b*, and 13*a*–13*b*) from a point 36 located on the feed deck surface 37; said point 36 being located at the midpoint of a transverse pivot axis extending between the lower ends of shafts 11 and 12 as seen in FIGS. 2 and 3. This point will be substantially coincident with the lower leading corner of the document when the leading end of the document is just entering the nip of said pairs of feed rollers 13*a*, 13*b*, etc.

Any suitable means 18, 19 and 50 may be provided immediately downstream, or to the right as seen in FIG.

1 and 2, from the document turning station 10 for taking away a document that has passed through the station 10. Such take-away means for example may comprise a first transfer roll unit 18 that includes a pair of vertically disposed shafts 21, 22; both of the latter being mounted for yieldable swinging movement in a manner similar to that for shaft 12 so that the "D" shaped feed rollers may be yieldably biased towards each other respectively to the extent permitted by suitable stops S, FIG. 1. The "D" shaped feed rollers whose normal relative positions are illustrated in FIG. 1 are all adapted to be driven by means of one-revolution clutches that are coupled in a conventional manner to said shafts 21 and 22 so as to be hereby capable of transferring successive documents from the turning station 10 to the exit belt conveyor means 50. A second similar take away roll unit 19 may be provided if and when desired. Similarly any suitable input feed means may be provided immediately upstream from the turning station 10 for yieldably advancing a document into the nip of said feed rollers at station 10 as indicated by arrow 41 of FIGS. 1 and 2, which means may for example include a belt type conveyor means 42.

In operation an upstanding document 40, such as a large envelope, is advanced along its lower edge over the feed deck surface 37 by said input means so that the leading edge thereof moves into the nip of the feed rollers 13*a*, 13*b* etc. of the document turning station 10. With the feed rollers 13*a*, 14*a*, 15*a* and 16*a* being driven at the above noted effective proportional speeds the document 40 will be drawn through the turning station 10, however in doing so the upper portion of the document, as seen in FIGS. 2 and 3, will be driven at proportionately higher speeds than the lower portions thereof whereby the document will be swung, as indicated by arrow 44, FIG. 2, about the said pivot point 36; which point is coincident with the lower leading corner of the turning document 40. This swinging or turning motion will continue through substantially 90 degrees during which time the document will move through positions such as is illustrated by dotted lines 40*a* of FIG. 2 and will finally arrive at a position 40*b* wherein that edge of the document that had been the leading edge before entry into station 10 will now be the lower document edge along which the document may now move. After arriving in position 40*b* which is accommodated by the vertical opening afforded by the said normal FIG. 1 positions of the "D" shaped take away rollers 23*a*, 23*b*, 23*a* and 24*b* the latter may be driven through one revolution so as to frictionally transfer the turned document away from the turning station 10 and to the said conveyor belt means 50.

As will be seen from the above description a document such as 40 that is fed into the turning station 10 will not only be swung forwardly 90 degrees in its own plane and about its lower leading corner but the lowermost edge of the document both before and after this turning movement will be in engagement with the horizontal planar feed deck surface 37 and hence the document will need no realignment or repositioning with respect to the horizontal feed path which the document is to follow in moving into and out of the turning station 10.

If is is desired to have a document pass through the station 10 without being swung through said 90 degree turn the drive for the four feed rollers 13*a*, 14*a*, 15*a*, and 15*a* at station 10 may be selectively conditioned so that said rollers are driven at the same effective peripheral speed whereby a document will move straight through the station with its lower edge in continual engagement with the upper surface 37 of the feed deck.

Figure 4:
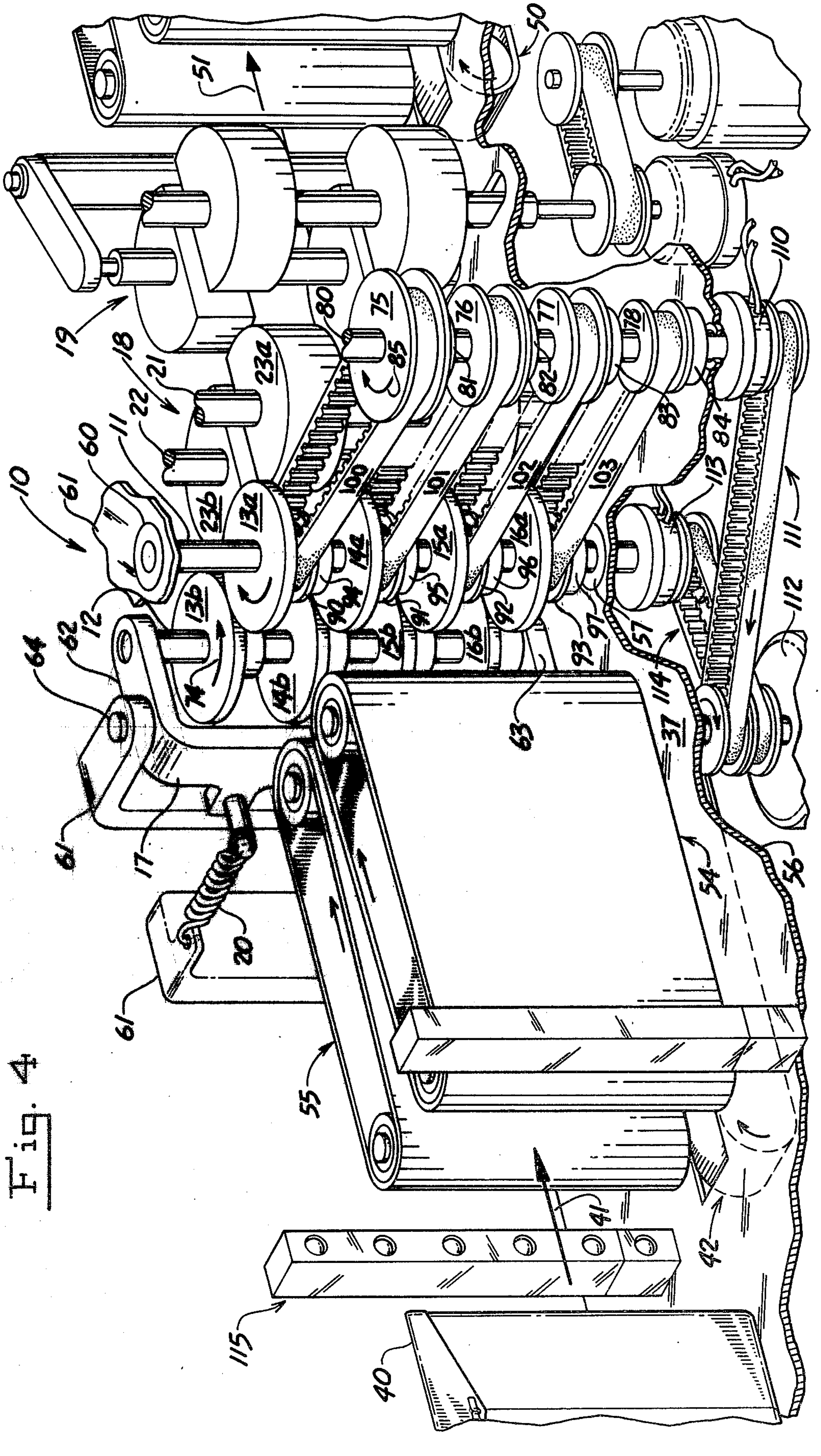
FIG. 4 is a perspective view illustrating the present apparatus for carrying out the document handling operations illustrated by FIGS. 1-3.

The detailed structural arrangement for the operational system just discussed in connection with FIGS. 1–3 will now be described with reference to FIG. 4 wherein some of the parts have reference numerals that are the same as the respective corresponding parts illustrated in FIGS. 1–3. In FIG. 4 the vertically disposed document 40 is adapted to be yieldably advanced into the nip of the feed rollers 13*a*–16*a* and 13*b*–16*b* of the turning station 10 by any suitable means such as conveyor 42, assisted by the converging side belt conveyors 54, 55; each such belt conveyor being constructed, mounted and driven by any conventional means so as to yieldably advance the document 40 into the said turning station 10. The document take away means 18, 19 and 50 include components which are suitably mounted on the machine frame and are disposed and driven as generally described above by any conventional means so as to be capable of transferring the turned documents from the turning station 10 to the belt conveyor 50 as indicated by arrow 51. In that the structural details of the document input means 42, 54, and 55 and the document take away means 18, 19 and 50 form no part of the present invention no further structural description thereof will be made here.

The turning station 10 comprises a feed deck plate 56 which is suitably carried by the machine frame and which has a horizontal upper planar surface 37; the latter in combination with the confines of the turning station 10 effectively defining a feed path along which may slidably move the lower edges of the documents that are to be advanced to, through and away from said turning station 10. The lower end of the vertical shaft 11 is rotatably supported by the deck plate, utilizing a suitable bearing such as illustrated at 57, while upper end thereof is rotatably supported by a suitable bearing 60 carried by the machine frame 61. The upper and lower ends of the shaft 12 are rotatably supported by the horizontal arms 62 and 63 of a bail member 17 that is pivotally mounted on the machine frame 61 by means of axially aligned pivot studs 64 (only the upper one of such studs being shown in FIG. 4 for ease of illustration). Spring means 20 serves to rotatably bias said pivoted bail 17 in a clockwise direction, as seen in FIG. 4, so as to yieldably urge the feed rollers 13*b*, 14*b*, 15*b* and 16*b* carried by shaft 12 into peripheral engagement with the said feed rollers 13*a*, 14*a*, 15*a*, and 16*a*, respectively, carried by shaft 11. This yieldable bias support for shaft 12 permits documents of varying thicknesses to be frictionally driven through the turning station 10. The four feed rollers 13*b*, 14*b* 15*b*, and 16*b* all have substantially equal effective outside diameters and are rotatively mounted on their associated supporting idler shaft 12 so as to be capable of rotating at different rotative speeds and in opposed relation with respect to their respectively associated rollers 13*a*, 14*a*, 15*a* and 16*a* carried by shaft 11. Feed rollers 13*a*, 14*a*, 15*a* and 16*a* all have substantially equal effective outside diameters and are adapted to be driven either at the same or at different speeds by means which will now be described.

A vertically disposed shaft 80 is rotatably mounted in the machine frame in any suitable manner, such as that just described for the shaft 11, and carries four axially spaced drive pulleys 75, 76, 77 and 78 which are rotatively coupled to the shaft 80 through conventional over-running or one-way clutches 81, 82, 83 and 84 respectively so that the latter are capable of rotatably driving said pulleys 75–78 in a clockwise direction as indicated by arrow 85 of FIG. 4. The pulleys 75–78 are adapted to drive the said feed rollers 13*a*, 14*a*, 15*a* and 16*a* respectively and to this end the feed rollers 13*a*, 14*a*, 15*a* and 16*a* have fixedly secured thereto pulleys 90, 91, 92 and 93 which in turn are rotatively coupled to said shaft 11 through conventional over-running or one-way clutches 94, 95, 96, and 97 respectively. The four pulleys 90–93 are adapted to be rotatably driven by the four drive pulleys 75–78 through four belts 100, 101, 102, and 103 respectively. The lower end of drive shaft 80 is coupled to an electromagnetic clutch 110 and the latter is adapted to be driven by any suitable power input means such as a conventional type belt and pulley arrangement, generally illustrated by reference numeral 111, which in turn is driven by a motor 112 that is suitably supported on the machine frame. It will be noted that although the pulleys 90–93 have substantially equal effective diameters the respectively associated drive pulleys 75–78 vary in effective diameter such that the feed rollers 13*a*, 14*a*, 15*a* and 16*a* may be driven at different effective peripheral speeds in accordance with the proportionality described in connection with arrows 30–33 of FIG. 2. It will also be noted that when the feed rollers 13*a*–16*a* are being driven at different speeds by pulleys 75–78 the one-way clutches 94–97 respectively associated with said feed rollers will be in their over-running mode and shaft 11 will be stationary, that is not rotating.

As previously described when the feed rollers 13*a*–16*a* are being driven at different speeds by their respectively associated drive pulleys 75–78 a document which is advanced along the feed surface 37 into the nip between the four pairs of feed rollers 13*a*–16*a*, 13*b*–16*b* will be swung in its own plane through a 90 degree turn at the turning station 10 and thereafter is moved away from said station along the same planar surface 37 without the necessity of having to be realigned or otherwise repositioned with respect to said feed path and planar surface. This non-realigning feature greatly simplifies the document handling apparatus required to feed the document along a prescribed feed path.

In some instances it may be desirably to have the document move straight through the turning station 10 without being swung forward through said 90 degree turn, and provision is made to accommodate this alternate action. To this end the lower end of shaft 11 is coupled to an electromagnetic clutch 113 which is also driven by said motor 112 through a conventional type belt and pulley arrangement generally indicated at 114. When the electromagnetic clutch 110 is energized the clutch 113 remains de-energized and the document turning station 10 will function as above described. When, however a document is to pass through station 10 without being turned 90 degrees the clutch 110 is de-energized and clutch 113 is energized. Under these conditions the shaft 11 will be driven directly from motor 112 through said belt and pulley arrangement 114 so that all four feed rollers 13*a*–16*a* are thereby driven by shaft 11 at the same effective peripheral speed by and through their associated one-way clutches 94–97 respectively. Thus with all four feed rollers 13*a*–16*a* rotating at the same speed any document which is advanced into the nip of the feed rollers at station 10 will be driven straight through the station 10 to the said take away means 18, 19 and 50 without being turned.

Suitable control means may be utilized to control the mutually exclusive operation of clutches 110 and 113 in order to produce either of the above described turn or no-turn operations at the station 10; for example a photo-cell device including sensing means 115 may be used to sense the orientation of the long axis of a document and accordingly control the condition of said clutches 110 and 113 so as to produce a 90 degree turn when said long axis of the document is to be shifted from a vertical to a horizontal position.

One particularly advantageous application of the above described apparatus is in a mail handling system wherein mixed thickness flat mail pieces are to be serially fed along a predetermined document feed path. In such a system it is often necessary to rotate a mail piece through 90 degrees in its own plane whenever the mail piece is standing on its end, i.e., where the long axis thereof extends vertically instead of horizontally, as illustrated by the document 40 in FIG. 2; this re-orienting of the mailpiece serving to facilitate subsequent handling and to stabilize the transport movement of the piece. In other cases it is necessary to turn a mail piece end for end through 180 degrees so as to orient the stamp of the mailpiece in a proper position for subsequent cancelling by appropriate printing dies. In this case two turning stations 10 are serially arranged along the feed path so that the mail piece may be turned through two successive 90 degree turns. In other cases a mail piece may need no turning and should be passed through one or more stations such as station 10 without being turned. As will be apparent the above described apparatus is capable of accommodating all three of these mail handling situations.

The above described apparatus for the turning station 10 has been found to perform efficiently and produces a quick document turning action with no document reorientation being required after completion of the turning operation.

We claim:

1. A device for selectively turning serially fed documents, said turning device comprising:

guide means for establishing a document feed path, said guide means including a plate having a planar surface on which an edge of each of said documents is slidably movable;

document drive means disposed along said feed path for turning a selected document through an angle in its own plane, said document drive means including a plurality of axially aligned feed rollers having substantially the same diameter, said drive means also including a plurality of axially-aligned idler rollers cooperatively peripherally aligned on a one-for-one basis with said feed rollers; and selectively operable means for actuating said drive means, said selectively operable means including means for rotating the respective feed rollers at peripheral speeds proportional to the respective distances of said feed rollers from a predetermined axis whereby said drive means turns said selected document fed thereto, and said selectively operable means also including means for rotating the respective feed rollers at the same peripheral speed whereby said drive means slidably moves documents fed thereto on said plate without turning said documents.

2. Apparatus as defined by claim 1 wherein said predetermined axis is located at said surface and extends laterally through the lower leading corner of a document that just enters the nips of the respective opposed feed roller-idler roller pairs.

3. Apparatus as defined by claim 2 wherein said predetermined axis extends transversely with respect to the plane of movement of said selected document.

4. Apparatus as defined by claim 1 wherein said guide means and drive means cooperate to cause each document to move on its lowermost edge along said feed path after being moved through said drive means.

5. Apparatus as defined by claim 1 wherein said means for rotating said feed rollers at proportional peripheral speeds includes a plurality of one-way clutches drivingly connected to the respective feed rollers on a one-for-one basis and through which said feed rollers are rotated at different peripheral speeds for turning said selected document.

6. Apparatus as defined by claim 5 wherein said selective actuating means includes a common power means for activating both of said rotating means.

* * * * *